Patented Oct. 14, 1947

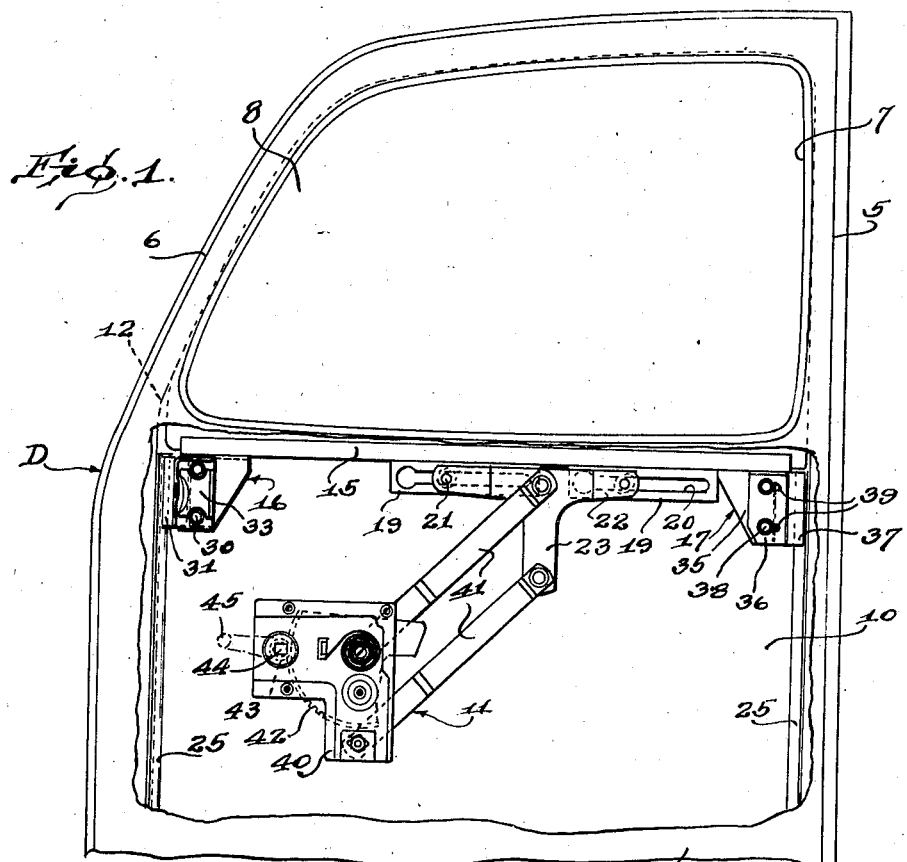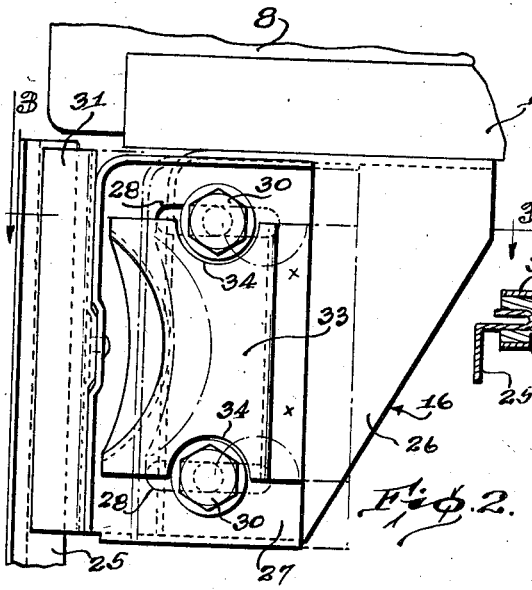

2,429,156

UNITED STATES PATENT OFFICE 2,429,156

GUIDE MEANS FOR VEHICLE WINDOWS

Burton S. Floraday, Toledo, Ohio, assignor to Marvel Equipment Corporation, Detroit, Mich., a corporation of Michigan Application December 4, 1944, Serial No. 566,554

11 Claims. (Cl. 296—44.5)

This invention relates to the guiding of sliding window panels, particularly for use on vehicles, such as automobiles, wherein the window panel slides in and out of a well disposed at one side of the window opening, which not infrequently is so shaped that the correspondingly shaped window panel is not supported adequately, if at all, along its opposite side edge portions.

An object is to produce a simple and efficient guide device for window panels of the above type, which is not only inexpensive to manufacture and install, but is so designed that the chances of the panel being fitted too tightly or too loosely are greatly reduced, if not entirely eliminated.

Another object is to produce guiding means for vehicle window panels in which two guide devices are employed, one of which has a predetermined adjustment so designed that inaccuracy in mounting is largely eliminated, thereby not only expediting the mounting of the window panel but also insuring that accurate mounting is obtained.

A further object is to produce a vehicle window guide, which cannot be secured in the desired guiding position unless the parts have been adjusted to a position predetermined to be proper for the particular installation.

It is often possible to facilitate installation of mechanism at the time of final assembly by previously providing a simple and readily handled sub-assembly construction. The method of manufacture is particularly advantageous in the production of automotive and other vehicle bodies and it is toward this end that this invention is directed. An embodiment of the present invention is illustrated in the accompanying drawings in which:

Figure 1 is a side elevational view of an automobile door with parts broken away illustrating the preferred embodiment of the invention incorporated therein;

Figure 2 is an enlarged fragmentary elevational view of a part of the construction shown in Figure 1; and Figure 3 is a transverse sectional view taken on line 3—3 of Figure 2.

Referring now to Figure 1 of the drawings, the door D, which may be that of an automobile or other vehicle, is of substantially standard construction including in its upper portion a vertical pillar post 5 and a sloping pillar 6 connected together at their upper ends to form a window opening 7 which is adapted to be closed by a sliding glass panel or pane 8. The lower portion of the door comprises inner and outer door panels 9 and 10 respectively, spaced apart to provide a well into which the panel 8 may be lowered by regulator mechanism, indicated at 11. The members forming the window opening 7 are provided with the usual guide channel 12 by which the window panel is engaged and guided during its movement between open and closed positions.

As the window is lowered, the edge of the glass panel 8 adjacent the sloping pillar moves out of engagement with the guide channel therein, so that it is unsupported in that region. In order to guide and support the glass during movement into and out of the well, I have provided a glass channel 15, which is secured to the lower edge of the panel 8 and is provided at each end with depending guide devices 16 and 17 respectively. Also secured to the channel bar 15 is a pair of retainer members 19 having horizontally elongate slots 20 therein adapted slidably to receive studs 21 carried at the outer end of arms 22, which form a part of a T-shaped member 23. The member 23 is included as a part of the regulator mechanism 11, a description of which will follow presently.

The guide devices 16 and 17 are arranged in a manner to direct the movement of the glass panel 8 and channel bar 15 along a vertical plane within the window well. The guides engage vertically disposed rails 25, which are secured to opposite sides of the door within the well. The rails are preferably installed during construction of the door and under such conditions that not infrequently their spacing and position may vary. By providing the guides 16 and 17 with adjustable features inaccuracies may be compensated for quite readily. The adjustable nature of the guides provides the further feature of facilitating installation or removal of the glass panel from the door or vehicle body structure.

To this end the guide 16 includes a depending bracket 26 adapted adjustably to support a plate 27 having a pair of vertically spaced, horizontally elongate slots 28 formed therein. The bracket 26 may be spot welded to the under side of the channel bar 15. Bolts 30 passing through the slots are threaded into the bracket 26 to secure the plate 33 in adjusted position. A channel shaped, rail engaging guide strip 31 is riveted to the flanged outer edge of the plate 27 for sliding contact with the rail and is of such length as to insure vertical positioning of the window panel at all times. A liner 32 of felt or the like is provided in each strip 31, thereby obviating a metal to metal sliding engagement.

The plate 27 of the guide 16 has spot welded thereto a cover plate 33, a portion of which is spaced outwardly from the plate 27 and adapted partially to conceal at times the heads of the bolts 30. The member 33 is provided in its upper and lower edges with semicircular notches 34, which are sufficiently large that the heads of the bolts 30 are made accessible for engagement by a socket wrench, indicated at W in Figure 3, when the plate 27 is in outward or extended position. This position is determined by the length of the slots 28 and, when so adjusted, the guide strip 31 is arranged to engage the rail 25 for properly aligning the glass panel with the window opening.

When the plate 27 is secured in the full line position shown in Figure 2, the guide device 17 is then adjusted. This guide is similar to the guide 16 and includes a depending mounting bracket 35, which supports a horizontally slidable plate 36 carrying a rail engaging guide channel 37. The plate 36 is mounted by means of a pair of bolts 38 threaded into the plate 35 and passing through vertically spaced horizontally elongate slots 39 in the bracket 36. The slots are of sufficient length to permit in and out movement of the plate for suitable engagement of the rail 25 by the channel guide strip 37. In view of the foregoing it will be apparent that with the guide 16 fixed in position, it is only necessary to adjust the guide 17 when the window is assembled.

The regulator mechanism 11 is of conventional design and comprises generally an L-shaped mounting plate 40, which is adapted to be secured to the inner door panel 9. A pair of parallel arms 41 are pivoted at opposite ends respectively to the plate 40 and T-shaped member 23 and provide operable support for the window assembly previously described. A segmental gear 42 carried by the upper arm 41 is engaged by a pinion 43 also mounted on the plate 40 on a shaft 44 for operating the regulator. A suitable crank handle 45 attached to the shaft 44 enables manual operation of the regulator in a well known manner.

From the above description, it will be evident that the window panel can be installed in the vehicle body much more quickly and accurately. After the window panel is in position, the guide device 16 is first moved to the left of Figure 1 in order to place the channel shaped guide strip 32 in the proper position with respect to the rail 25. Manifestly this strip as well as the corresponding strip of the guide 17 must be moved inwardly away from the respective rails to enable installation. As above explained, the cover plate member 33 must be moved to the left to the full length of the slots 28, before the wrench W can be applied to the heads of the bolts 30 through the notches 34. Thus, the length of the slots is predetermined so that when in position for the bolts 30 to be tightened, the guide strip 31 will have been moved to the proper position to place the guide panel 8 correctly within the body. Consequently proper arrangement of the parts can be quickly and conveniently achieved and without troublesome and time-consuming adjustment, which usually requires the careful attention of the workman. After the guide 16 is properly tightened in position, the guide 17 is manipulated to bring the guide strip 37 into proper relation with the adjacent guide rail 25 to establish a nice sliding fit. Thus, only one guide requires any care of adjustment so that the chances of poorly fitting window guides are greatly reduced.

Numerous changes in details of construction and arrangement may be effected without departing from the invention especially as defined in the appended claims.

What I claim is:

1. A guide device for a vehicle window panel adapted to be mounted in a window frame for up and down sliding movements into and out of a window well, said guide device including guide members adapted to be mounted on the bottom of the window panel for adjusting movement in planes transverse to the sliding movement of the window, fastener means associated with one guide member for retaining same in adjusted position, and means for militating against access to said fastener means until the respective guide member has been adjusted to a predetermined position.

2. A guide device for a vehicle window panel adapted to be mounted in a window frame for up and down sliding movements into and out of a window well, said guide device including guide members adapted to be mounted on the bottom of the window panel for adjusting movement in planes transverse to the sliding movement of the window, bolt and slot means forming a part of one guide member for successively adjusting and securing same, the slot being of such length that upon movement of the respective guide member in one direction to the limit afforded thereby, the guide member is disposed in the desired guiding position, and means for militating against access to said bolt until the said guide member is in such guiding position.

3. A guide device for a vehicle window panel adapted to be mounted in a window frame for up and down sliding movements into and out of a window well, said guide device including guide members adapted to be mounted on the bottom of the window panel for adjusting movement in planes transverse to the sliding movement of the window, a mounting for each guide member enabling sliding movements thereof, one mounting including bolt and slot means, the length of the slot being such that movement of the respective guide member to the limit afforded thereby enables same to be disposed in a predetermined guiding position, and means for concealing said bolt until said guide member is adjusted to such guiding position.

4. A guide device for vehicle window panel adapted to be mounted in a window frame for up and down sliding movements into and out of a window well having fixed rails for guiding window movements, said guide device including guide members adapted to be mounted on the bottom of the window panel for adjusting movement in planes transverse to the sliding movement of the window, each guide member having an elongate rail engaging channel strip fixed thereto, a mounting for each guide member enabling sliding movements thereof and including bolt and slot means, a cover forming a part of one guide member for concealing the respective bolt until the guide member has been adjusted to a predetermined position.

5. A guide device for vehicle window panel adapted to be mounted in a window frame for up and down sliding movements into and out of a window well, said guide device including guide members adapted to be mounted on the bottom of the window panel for adjusting movement in planes transverse to the sliding movement of the window, fastener means associated with one guide member for retaining same in adjusted position, and cover means forming a part of said last guide member adapted to render said fastener means inaccessible for tightening until said guide member has been adjusted to a predetermined position.

6. A guide device for vehicle window panel adapted to be mounted in a window frame for up and down sliding movements into and out of a window well, said guide device including guide members adapted to be mounted on the bottom of the window panel for adjusting movement in planes transverse to the sliding movement of the window, each guide member having a bracket fixed to the window panel, a guide element having a vertically disposed elongate guide strip, a mounting for said guide elements enabling sliding movements toward and away from position of use, fastener means for securing said guide elements in position of adjustment, and a cover plate on one of said guide elements adapted to conceal said fastener means, said cover plate having a cut out portion to reveal said fastener means when the respective guide element has been adjusted to a predetermined position.

7. A guide device for vehicle window panel adapted to be mounted in a window frame for up and down sliding movements into and out of a window well, said guide device including guide members adapted to be mounted on the bottom of the window panel for adjusting movement in planes transverse to the sliding movement of the window, each guide member having a bracket fixed to the window panel, a guide element having a vertically disposed elongate guide strip, a mounting for said guide elements enabling sliding movements toward and away from position of use, said mounting comprising elongate slot and bolt means in said bracket and guide elements, a cover plate fixed to one guide element and adapted to overlie said bolt means to prevent access thereto, and notch means in said cover plate enabling access to said bolt means when said guide element has been moved to a predetermined position.

8. A guide structure for a vehicle window panel, comprising a member adapted to be secured to an edge of the panel, a guide device, means including a fastener element for adjustably mounting said device on said member, and means for blocking access to said fastener element until said guide device is in a predetermined position with respect to said member.

9. A guide structure for a vehicle window panel, comprising a member adapted to be secured to an edge of the panel, a guide device, means for adjustably mounting said device on said member to permit the device to be shifted on the member between predetermined limits, fastener means for locking said device and means for blocking access to said fastener means when the device is positioned on the member away from one of said limits.

10. A guide structure for a vehicle window panel, comprising a member adapted to be secured to an edge of the panel, a guide device, means for adjustably mounting said device on said member for longitudinal movement toward and from a fixed guide with which a part of said device is adapted to cooperate in guiding the window panel, said means including a slot in said device and a fastener element extending through the slot into said member for permitting the guide device to be shifted between limits determined by the length of the slot, and means for blocking access to said fastener element when the latter is in position in the slot between said limits.

11. A guide structure for a vehicle window panel, comprising a member adapted to be secured to an edge of the panel, a guide device, means for adjustably mounting said device on said member for longitudinal movement toward and from a fixed guide with which a part of said device is adapted to cooperate in guiding the window panel, said means including a slot in said device and a fastener element extending through the slot into said member for permitting the guide device to be shifted between limits determined by the length of the slot, and means carried by said device for blocking access to said fastener element when the latter is in position in the slot between said limits.

BURTON S. FLORADAY.

REFERENCES CITED

The following references are of record in the file of this patent:

UNITED STATES PATENTS

| Number | Name | Date |
|---|---|---|
| 1,713,088 | Nicholson | May 14, 1929 |
| 2,236,451 | Roethel | Mar. 25, 1941 |
| 2,081,896 | Axe | June 1, 1937 |
| 1,403,575 | Sheehan et al. | Jan. 17, 1922 |